(12) United States Patent
Grøtheim

(10) Patent No.: US 9,522,345 B2
(45) Date of Patent: Dec. 20, 2016

(54) DEVICE FOR A CLEANING UNIT FOR HYDRAULIC OIL AND LUBRICATING OIL

(75) Inventor: Jens Terje Grøtheim, Drøbak (NO)

(73) Assignee: Future Engineering AS, Drobak (NO)

(*) Notice: Subject to any disclaimer, the term of this patent is extended or adjusted under 35 U.S.C. 154(b) by 338 days.

(21) Appl. No.: 13/880,501

(22) PCT Filed: Oct. 27, 2010

(86) PCT No.: PCT/NO2010/000382
§ 371 (c)(1),
(2), (4) Date: May 6, 2013

(87) PCT Pub. No.: WO2012/057629
PCT Pub. Date: May 3, 2012

(65) Prior Publication Data
US 2013/0270723 A1    Oct. 17, 2013

(51) Int. Cl.
*B01D 19/00* (2006.01)
*B01D 17/04* (2006.01)
*B01D 17/02* (2006.01)

(52) U.S. Cl.
CPC .......... *B01D 17/04* (2013.01); *B01D 17/0205* (2013.01); *B01D 17/042* (2013.01); *B01D 17/044* (2013.01); *B01D 19/001* (2013.01); *B01D 19/0036* (2013.01); *B01D 19/0047* (2013.01)

(58) Field of Classification Search
CPC .............. B01D 19/00–19/0094; B01D 17/04; B01D 17/0205; B01D 17/042; B01D 17/044

USPC ....... 261/64.5–126, 64.5–126; 208/184–186; 96/155–220; 220/567.2
See application file for complete search history.

(56) References Cited

U.S. PATENT DOCUMENTS

| 4,368,111 A | 1/1983 | Siefkin et al. |
| 4,476,928 A * | 10/1984 | Green ............ B01D 1/14 166/266 |
| 6,389,893 B1 * | 5/2002 | Kobayashi ........ G01F 22/00 73/290 B |

FOREIGN PATENT DOCUMENTS

| GB | 2445955 A * | 7/2008 | ........... B01D 1/305 |
| JP | 4346817 | 12/1992 | |
| NO | 308157 B1 | 5/1998 | |
| SU | 1346187 A1 | 10/1987 | |

* cited by examiner

*Primary Examiner* — Thomas Bennett McKenzie
(74) *Attorney, Agent, or Firm* — Gable Gotwals

(57) ABSTRACT

A device for a cleaning unit for hydraulic oil or lubricating oil circulating in connection with a drive unit, wherein the cleaning unit comprises a cleaning tank provided with an oil inlet for untreated oil, means arranged to spread the untreated oil over a substantial portion of the cleaning tank cross-section, an inlet for introducing gas into the untreated oil, and an outlet for evacuation of gas and water vapor, and also a means having a large surface area arranged downstream of the spreader means, wherein the means having a large surface area is provided as a plurality of bodies arranged to be able to float on the treated oil.

6 Claims, 1 Drawing Sheet

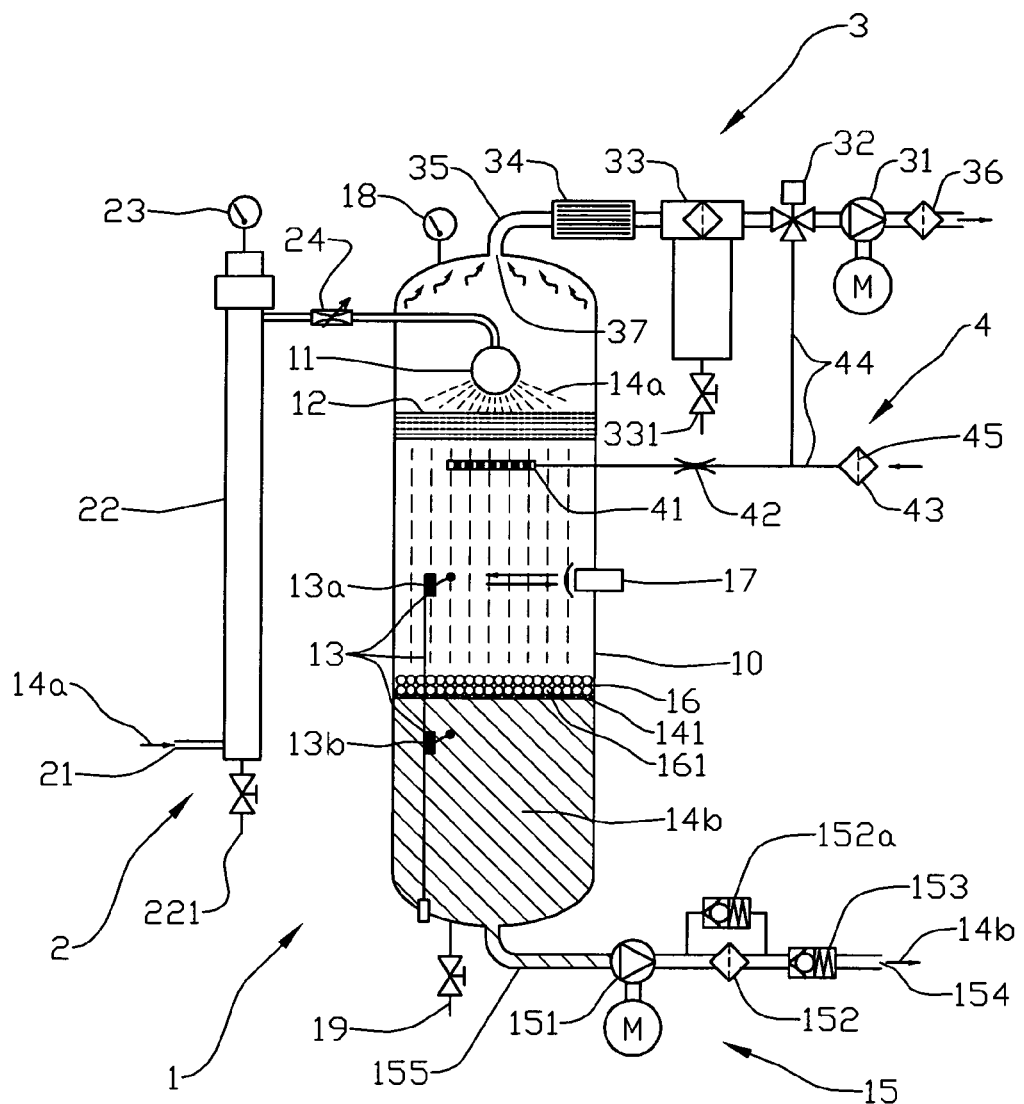

DEVICE FOR A CLEANING UNIT FOR HYDRAULIC OIL AND LUBRICATING OIL

CROSS-REFERENCE TO RELATED APPLICATIONS

This United States application is the National Phase of PCT Application No. PCT/NO2010/000382 filed 27 Oct. 2010, which is incorporated herein by reference.

STATEMENT REGARDING FEDERALLY SPONSORED RESEARCH OR DEVELOPMENT

Not Applicable

THE NAMES OF THE PARTIES TO A JOIN RESEARCH AGREEMENT

Not Applicable

INCORPORATION-BY-REFERENCE OF MATERIAL SUBMITTED ON A COMPACT DISC OR AS A TEST FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

The invention relates to a device for a cleaning unit for hydraulic oil or lubricating oil circulating in connection with a drive unit, wherein the cleaning unit comprises a cleaning tank, means arranged for spreading an untreated oil over a substantial portion of the cleaning tank cross-section, an inlet for introducing gas into the untreated oil, and an outlet for evacuating gas and water vapour, and also a means having a large surface area arranged downstream of the spreading means, more particularly by the means having a large surface area being provided as a plurality of bodies arranged to be able to float on the treated oil.

Great demands are made on the oil quality in hydraulic and lubricating systems connected with drive units, engines and the like, particularly where one is dependent on continuous running or where no access to adequate backup solutions in case of an outage of a main plant is available. The oil used must maintain its quality over long periods of time, and from an economical point of view it is desirable to have long replacement intervals for the oil used. To maintain the lubricating and conserving properties of the oil, strict requirements to the oil cleanness are set, i.e. the content of foreign particles and water. It is neither desirable for the oil to contain gases.

Foreign particles may inflict mechanical damage to the moving parts to be lubricated in the form of wear on bearing surfaces and the like.

Water contained in the oil may cause
corrosion;
reduction in the dynamic viscosity, which may lead to weakening or complete loss of the lubricating film; and
changes in the structure of the oil, which may lead to formation of detrimental oxidation products, slime or bacterial growth.

Air or another gas in the oil may cause
cavitation in the system e.g. in pumps;
local overheating of the oil;
aging/oxidation;
unstable control of hydraulically generated movements; and
weakening of the dynamic lubricating film.

BRIEF SUMMARY OF THE INVENTION

There is a need to obtain a cleaning unit ensuring a high quality of hydraulic oils and lubricating oils inside small, available spaces, if possible arranged for temporary hook-up to the drive unit containing the oil to be cleaned, as the cleaning unit is made portable. It is also an aim to obtain a cleaning unit that may be used while the drive unit is in ordinary operation. It is a particular aim to obtain a device for the cleaning unit wherein formation of foam caused by gas supply to the oil during the cleaning process is controlled and diminished.

From NO308157 is known to lead oil to be cleaned of water, together with a gas, preferably air, into a container at a negative pressure such that the gas forms bubbles in the oil, and is heated by the surrounding oil, to thereby expand at the same time as the relative humidity diminishes. The gas may thereby absorb moisture from the oil. The gas and the oil are separated and are led out from the container. A split filling material arranged on a carrier plate in the container provides a surface maximising arrangement effecting further water vapour transfer. NO308157 is in its entirety included in this description as a reference.

The object of the invention is to remedy or reduce at least one of the disadvantages of the prior art.

The object is achieved by the features disclosed in the below description and in the subsequent claims.

The invention provides a device for a cleaning unit for hydraulic oil or lubricating oil circulating in connection with a drive unit, such as an engine or a hydraulic power unit, the cleaning unit being formed as an underpressure plant arranged for receiving and spreading of untreated oil over a so-called diffusor, whereafter gas is added to the oil, preferably atmospheric air, picking up water vapour from the oil and thereafter being led out from the underpressure plant. The cleaning unit is downstream of the diffusor provided with a means having a large surface over which the oil is spread to effect further evaporation from the oil. The means having the large surface is provided by a plurality of bodies being arranged floating on the surface of an accumulation of treated oil. The bodies are spherical or polygonal and are typically formed from plastic having a preferred diameter of about 20-50 mm. The bodies form a layer preventing collection of foam on the surface of the treated oil, as the weight of the bodies and also the contact with the oil foam causes formed bubbles to burst. To provide control of the foam formation, the cleaning unit is preferably provided with means for detecting the position of the bodies relative to the diffusor, as an optical sensor or similar is arranged downstream the diffusor and is connected to a control system for the cleaning unit.

More specifically the invention relates to a device for a cleaning unit for hydraulic oil or lubricating oil circulating in connection with a drive unit, wherein the cleaning unit comprises a cleaning tank provided with an oil inlet for untreated oil, means arranged to spread the untreated oil over a substantial portion of the cleaning tank cross-section, an inlet for introducing a gas into the untreated oil, and an outlet for evacuation of gas and water vapour, and also a means having a large surface area arranged downstream of the spreading means, characterised in that the means having a large surface area is provided as a plurality of bodies arranged to be able to float on the treated oil. Thereby is achieved both the advantage of an amplified separation of gas and water vapour by means of a large oil film surface and a decomposing effect on the oil foam formed during the cleaning process.

The bodies may exhibit spheroidal or polyhedral shape. This renders the advantage of being able to use a wide spread of body shapes.

The bodies may be provided as hollow plastic bodies. The bodies are thereby resistant and reasonable to procure. The specific gravity of the bodies is adapted to the present need in the selection of raw material and the size of the cavities.

The cleaning tank may downstream of the spreading means be provided with a means for detecting of the means having the large surface area and/or oil foam formed over a portion of the treated oil. The detection means may be an optical sensor. Thus the risk of an uncontrolled foam formation is reduced.

The detection means may be arranged to be able to effect an increase of a gas pressure in the cleaning tank when the means having a large surface area and/or the oil foam has reached a predetermined level in the cleaning tank, as the detection means is connected to a control unit arranged to be able to regulate a vacuum plant, and possibly the vacuum plant and an air supply plant. If the foam formation gets out of hand by use of the level control, the pressure regulation will be able to have a quick effect on the foam formation.

BRIEF DESCRIPTION OF THE DRAWING

In the following is described an example of a preferred embodiment illustrated in the accompanying drawing, wherein:

FIG. 1 shows a partly sectioned principle sketch of a cleaning unit according to the invention.

DETAILED DESCRIPTION OF THE INVENTION

In the drawing the reference numeral 1 indicates a cleaning tank to which is connected an oil inlet 2 for untreated oil, a vacuum plant 3 for control of the pressure in the cleaning tank 1, and also an air supply plant 4. The cleaning unit is typically provided with a control unit (not shown) for monitoring and control of the cleaning process.

The cleaning tank 1 comprises an oil container 10 provided with an oil spreader 11 and an oil pan (diffusor) 12 of a per se known design. An oil level control 13 comprises an indicator 13a for an upper oil level and an indicator 13b for a lower oil level. The oil level control 13 is connected to a control system (not shown). Untreated oil is indicated by the reference numeral 14a, while treated oil is indicated by the reference numeral 14b. Oil foam gathering on top of the treated oil 14b, is indicated by the reference numeral 141.

An oil outlet 15 from a lower portion of the oil container 10 comprises a discharge pump 151, a discharge filter 152 having a filter bypass 152a, a non return valve 153 and an oil outlet 154 connected to a receiver (not shown) for treated oil, and is in a fluid communicating way interconnected by means of a discharge line 155.

The oil container 10 is provided with means having a large surface area 16 in the form of bodies 161 arranged to be able to float on the surface of the treated oil 14b. The bodies are shown here schematically as balls, but they may have any spheroidal or polyhedral shape, preferably having a diametric section of between 20 and 50 mm. The bodies 16 are typically hollow plastic bodies.

In the oil container 10 is arranged a foam level monitor 17, typically in the form of an optical sensor, arranged to be able to register when the level of oil foam 141 formed above the treated oil 14b exceeds a predetermined level. The foam level monitor 17 is connected to said control unit (not shown).

The oil container 10 also comprises a pressure gauge 18 and a drain outlet 19 for emptying of the cleaning tank 1, e.g. in connection with a cleaning operation.

The untreated oil 14a is fed through an oil intake 2 comprising an oil inlet 21, a heating element 22 having a drain 221, an oil temperature gauge 23 and also a flow control valve 24. The oil temperature gauge is typically connected to said control unit (not shown). The oil intake 2 is in a fluid communicating way connected to the oil spreader 11 in the cleaning tank 1.

The vacuum plant 3 comprises a vacuum pump 31, a vacuum control valve 32, a steam trap 33, a steam cooler 34 and a gas filter 36 which in a fluid communicating way are interconnected by means of a vacuum line 35. The vacuum plant 3 is connected to the cleaning tank 1 through a steam outlet 37 arranged in an upper portion of the oil container 10. The steam trap 33 is provided with a condensate drain 331.

The air supply plant 4 comprises an air spreader 41 arranged downstream the oil pan 12 and by means of air supply lines 44 are fluid communicatingly connected with an air inlet 45 via an air filter 43, and also with the vacuum control valve 32. A regulating nozzle 42 is arranged between the air inlet 45, respectively the vacuum control valve 32 and the air spreader 41.

The cleaning unit oil inlet 21 and oil outlet 154 are connected to a drive unit's (not shown) circulation circuit for hydraulic oil or lubricating oil 14a. A desired temperature, typically 55-60° C., is provided by means of the heating element 22, and the oil is spread finely over the oil pan 12 by means of the oil spreader 11 by an underpressure in the oil container 10 provided by the vacuum plant 3. Water vapour and gas are separated from the oil 14a being collected in the lower portion of the oil container 10 where the treated oil 14b is pumped into the circulation circuit of the drive unit (not shown). The separation of water vapour and gas from the oil 14b occurs in a per se known way by diffusion. The water vapour and the gas is evacuated from the cleaning tank 1 via the vacuum plant 3 wherein the vapour is condensed and other gases filtered.

By the means having a large surface area 16 the separation of the water vapour and the gas from the oil 14a is improved, in that the oil is dispersed over the large surface of the bodies 161.

Water-containing oil 14a has a strong tendency to form foam 141. By the bodies 161 floating on the surface of the treated oil 14b, the bodies will, in addition to their effect on separation of water vapour and gas, provide for the oil foam 141 being decomposed quickly, both by reduction of the foam surface tension and by the oil foam 141 being inflicted a load when the bodies 161 are floating on the oil foam 141.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A device for a cleaning unit for hydraulic oil or lubricating oil circulating in connection with a drive unit, said cleaning unit comprises:
    a cleaning tank (1) provided with an oil inlet (21) arranged to receive untreated oil (14a) from the drive unit;
    an oil spreader arranged to distribute the untreated oil (14a) over an oil diffuser located directly below the oil spreader and covering a cross-section of the cleaning tank;
    an inlet (41) located below the diffuser for introducing gas into the untreated oil;
    an outlet (37) for evacuation of gas and water vapour;
    a plurality of bodies having a surface area arranged downstream of the oil inlet, the plurality of bodies being arranged to float on treated oil (14b), and having a weight and/or shape that diminishes or prevents foaming in the cleaning tank (1); and;
    an outlet arranged to return the treated oil to the drive unit.

2. A device according to claim 1, wherein the plurality of bodies (161) have a spheroidal or a polyhedral shape.

3. A device according to claim 1, wherein the plurality of bodies (161) are hollow plastic bodies.

4. A device according to claim 1, wherein the plurality of bodies (161) have a diametric section in a range 20-50 mm.

5. A device according to claim 1, further including an optical sensor located downstream of the oil spreader for monitoring the plurality of bodies and/or oil foam (141) formed over a portion of treated oil (14b).

6. A device according to claim 5, wherein the optical sensor is arranged to regulate members selected from the group consisting of: a vacuum plant (3), and the vacuum plant (3) and an air supply plant (4) to effect an increase in a gas pressure in the cleaning tank (1) when the plurality of bodies having a surface area and/or the oil foam (141) has reached a predetermined level in the cleaning tank (1).

* * * * *